July 23, 1963    J. J. SHELTON    3,098,595
DITHERING SERVO VALVE AND WEB GUIDE SYSTEM
Filed Feb. 26, 1962    2 Sheets-Sheet 2
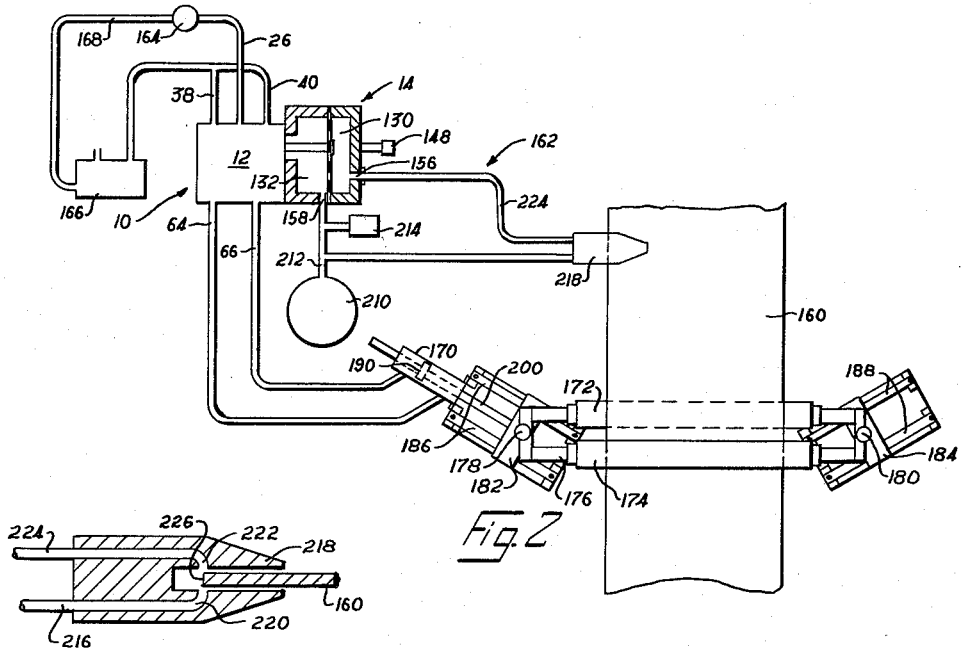
Fig. 2
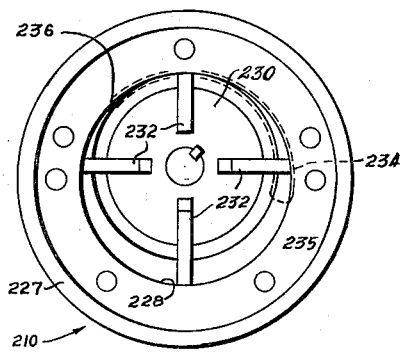
Fig. 3
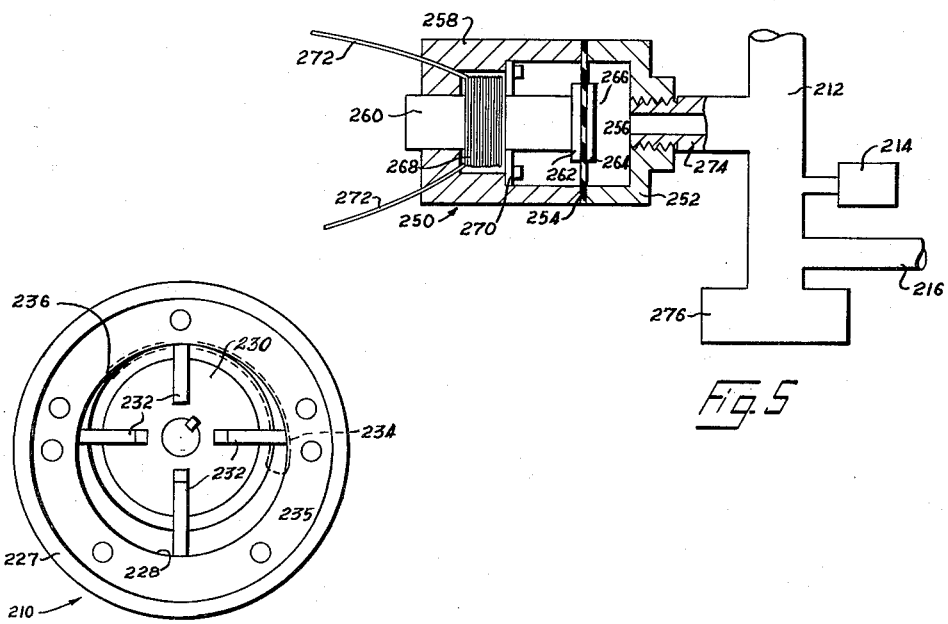
Fig. 4
Fig. 5
INVENTOR.
JOHN J. SHELTON
BY
Dunlap, Laney & Hubbard
ATTORNEYS 3,098,595
DITHERING SERVO VALVE AND WEB
GUIDE SYSTEM
John J. Shelton, Tuttle, Okla., assignor to Fife Manufacturing Company, Oklahoma City, Okla.
Filed Feb. 26, 1962, Ser. No. 175,590
12 Claims. (Cl. 226—22)

The present invention relates to servo valves and more particularly, but not by way of limitation, relates to an improved web guide system incorporating a dithering servo valve.

As is well known in the art, one of the more common methods for automatically guiding a traveling web, such as a very long strip of paper, plastic, cardboard, steel or other similar material, is to detect the relative position of the web by some type of sensing means which produces a pneumatic control signal having a pressure corresponding to the position of one edge of the web relative to the sensing means, and then reposition the relative position of the web by a servo valve controlled hydraulic motor which actuates a guide mechanism. When the web is traveling at a high rate of speed, a relatively slight movement of the guide mechanism will produce a relatively great change in the path of travel or position of the web. The pneumatic pressure signal from the sensing head is of necessity relatively low because it is customarily produced either by the conversion of the velocity of a pneumatic jet to a static pressure by variations in the magnitude of a vacuum. In either case, the position of the edge of the web relative to the pneumatic jet or intake aperture of the particular sensing means causes a variation in the pressure which is indicative of the position of the edge of the web. In order to have a highly sensitive servo motor of sufficient power to move the guide roller mechanism, the volume of hydraulic fluid necessary to actuate the motor should be relatively small in order to attain a quick response, and the small volume of fluid must be at relatively high pressure in order to generate the necessary force for repositioning the guide rollers. Therefore, the controlling servo valve must be extremely sensitive in order to accurately control the hydraulic motor and properly position the guide roller mechanism. Before the servo motor can accurately position the guide mechanism, it is imperative that the servo valve spool be positioned by the control fluid pressure so as to precisely close the valve each time that a given "null" pressure occurs. In other words, each time the fluid pressure increases from a selected "null" pressure which holds the servo valve in closed position, the valve spool should be moved a precise, proportionate distance. Then when the web is repositioned at the desired point by the guide rollers to produce the "null" pressure once again, the servo valve should again be precisely closed.

Since the actuating pneumatic pressure is very low and the valve must be very sensitive in that a slight movement of the valve spool must permit flow of hydraulic fluid to the servo motor, any frictional forces which occur in the servo valve tending to resist movement of the valve spool will result in erratic operation of the servo valve. In other words, should friction prevent the servo valve spool from being positioned precisely in the off position in response to "null" pressure, the web may be positioned at a different point after each actuation of the servo motor such that the guide rollers will continually hunt the necessary position for guiding the web along the desired path.

Since the servo valve, by the nature of the system, has a tendency to remain in the off position for somewhat extended periods of time, and is then normally moved only a minute distance in order to provide the necessary correction, the valve spool is highly susceptible to sticking due to congealing of the hydraulic fluid, collection of foreign particles around the valve spool, and loss of lubrication due to the fact that the normally horizontally disposed valve spool will rest against the wall of the valve cavity and displace the film of hydraulic fluid which normally provides lubrication between the two metal parts. In some cases, the valve spool may even be pressed against the valve cavity by a differential hydraulic pressure which substantially increases the sticking tendency of the valve spool.

As is well known in the servo valve art, frictional resistance to movement of the valve spool can be appreciably reduced by reciprocating the valve at a relatively high rate through a relatively minute stroke. The reciprocation of the valve is known in the art as "dithering" and effectively reduces frictional resistance to movement of the pilot valve spool by preventing congealing of the hydraulic fluid, maintaining a film of lubricating fluid around the spool, and preventing the deposition and collection of foreign particles or "silting" of the valve cavity. Dithering of the valve spool of course opens the various ports to the servo motor, but each of the two outlet ports of a four-way valve are opened an equal amount of time, such that the net flow to the servo motor is substantially zero, or corresponds to the average position of the valve spool. The spool may be dithered at a frequency sufficiently high that relatively little corresponding dither is produced in the hydraulic motor.

Various types of dithering servo valves have heretofore been developed for various applications. One of the more common types is the electrohydraulic servo valve in which an electrical signal is used to control the passage of a hydraulic fluid. By superimposing a high frequency alternating current signal on the electrical control signal, the valve spool can be made to dither and thereby effectively reduce friction. Various types of mechanical apparatuses have been devised for dithering servo valves with varying degrees of success but have in general been of exceedingly complicated construction. Also, servo valves have heretofore been dithered by various fluid operated mechanisms, but these mechanisms have also invariably entailed a high degree of complicity.

In accordance with the broader aspects of the present invention, it is contemplated to provide an improved servo valve for controlling the passage of fluids which servo valve is dithered by a fluid pressure to greatly reduce friction and increase the accuracy of response to a low pressure control fluid. The invention also contemplates an improved and novel pneumohydraulic system for guiding a traveling web. A preferred embodiment of the novel servo valve may be comprised generally of a valve housing having a valve cavity and a plurality of fluid ports in fluid communication with the valve cavity. A conventional spool member is reciprocally disposed in the cavity for controlling the passage of the fluid through the various ports and through the cavity. A fluid working surface is connected to the spool member for applying a force to the spool member as a result of fluid pressure applied to the working surface. Means are also provided for applying a pulsating fluid pressure to the chamber whereby a pulsating force will be applied to dither the spool member. This invention also contemplates various novel and highly advantageous details of construction for the servo valve and for the web guide system. These novel details of construction will be evident to those skilled in the art from the following specification and the appended claims.

Therefore, it is an important object of the present invention to provide a servo valve which is dithered by a fluid pressure.

Another object of this invention is to provide a fluid actuated servo valve which is very sensitive and has a highly accurate response to a relatively low pressure control signal.

Still another object of the present invention is to provide a servo valve of the type described which is actuated by a pneumatic control signal.

Yet another object of this invention is to provide a servo valve of the type described which is easily adjusted and which can be operated by a relatively wide range of fluid pressures.

Still another object of the present invention is to provide a servo valve of the type described which is very simple in construction and requires no precision machine parts in addition to the conventional valve parts.

Another very important object of the present invention is to provide a guide system for very accurately guiding a web traveling at a high rate of speed.

Yet another object of the present invention is to provide a web guiding system of the type described which is very simple and has a minimum of parts and which therefore can be very economically constructed and operated.

Many additional objects and advantages will be evident from the following detailed description and drawings, wherein:

FIG. 2 is a schematic diagram of a web guiding system constructed in accordance with the present invention;

FIG. 3 is a schematic view of the sensing head of the web guiding system of FIG. 2;

FIG. 4 is an end view of a fluid pump which may be utilized in the present invention, with the end plate thereof removed so as to show details of construction; and, FIG. 5 is a sectional view of an alternative apparatus which may be utilized in the web guiding system of FIG. 2.

Figure 1:
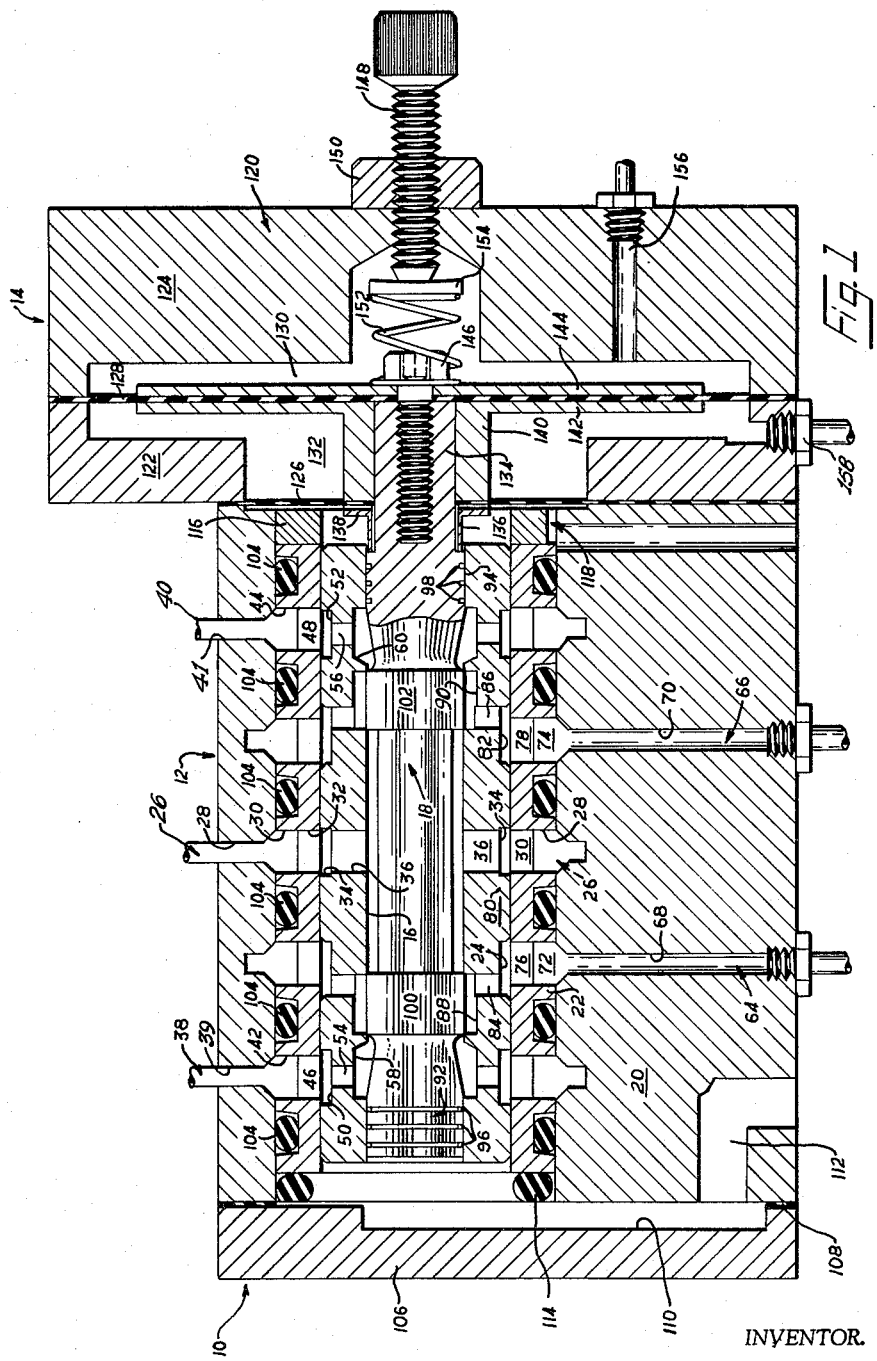
FIG. 1 is a sectional view of a servo valve constructed in accordance with the present invention.

Referring now to the drawings, and in particular to FIG. 1, a servo valve constructed in accordance with the present invention is indicated generally by the reference numeral 10. The servo valve 10 is comprised generally of a four-way hydraulic valve, indicated generally by the reference numeral 12, and a pneumatic servo valve actuator, indicated generally by the reference numeral 14. The four-way valve 12 may be of substantially any conventional design and is shown as having a valve cavity 16 and a valve spool member 18 reciprocally disposed therein. The valve cavity 16 is formed by an inner liner 24 which is contained by a cylindrical retainer 22, which in turn is disposed in a valve body 20.

A power fluid inlet port 26 communicates with the valve cavity 16 and is formed by a bore 28 in the valve body 20; a circumferential groove 30 and a plurality of bores 32 in the retainer 22; and, a circumferential groove 34 and radial bores 36 in the liner 24. A pair of return or exhaust fluid ports 38 and 40 communicate with the opposite ends of the valve cavity 16 and are formed by substantially the same type of structure as the power fluid inlet port 26. The exhaust fluid ports 38 and 40 are formed by bores 39 and 41 in the valve body 20; circumferential grooves 42 and 44 and radial bores 46 and 48 in the retainer 22; and, circumferential grooves 50 and 52, radial bores 54 and 56, and annular grooves 58 and 60 in the liner 24. A pair of power fluid outlet ports 64 and 66 communicate with the valve cavity 16 and are disposed between the power fluid inlet port 26 and the exhaust fluid ports 38 and 40, respectively. The power fluid outlet ports 64 and 66 are comprised of bores 68 and 70 in the valve body 20; circumferential grooves 72 and 74 and radial bores 76 and 78 in the retainer 22; and, circumferential grooves 80 and 82, radial bores 84 and 86, and annular grooves 88 and 90 in the liner 24.

Sealing lands 92 and 94 are provided at each end of the valve spool 18 which engage the valve cavity 16 to provide a peripheral seal. The lands 92 and 94 may be provided with a series of conventional circumferential grooves 96 and 98 for increasing the sealing effect and promoting proper lubrication between the valve spool 18 and the walls of the valve cavity 16. A pair of inner lands 100 and 102 are seized to provide circumferential sealing engagement with the valve cavity 16, and have a longitudinal length corresponding substantially to the width of the annular grooves 88 and 90 of the ports 64 and 66. Also, it will be noted that the lands 100 and 102 register with the annular grooves 88 and 90 at the same time so as to simultaneously close both the power fluid outlet ports 64 and 66.

To summarize the operation of the four-way valve 12, it will be noted that hydraulic power fluid in the inlet port 26 is constantly in fluid communication with the center portion of the valve cavity 16 between the inner lands 100 and 102. When the valve spool 18 is centered in the position shown in FIG. 1, both outlet ports 64 and 66 are closed. However, when the valve spool 18 is shifted to the left, when referring to FIG. 1, the power fluid inlet port 26 will be placed in fluid communication with the outlet port 64. Simultaneously, the outlet port 66 will be placed in fluid communication with the exhaust fluid port 40. Therefore, power fluid will pass through the outlet port 64 to a servo motor, to be hereafter described, and will return through the outlet port 66. On the other hand, when the valve spool 18 is shifted to the right, the power fluid inlet port 26 will be placed in fluid communication with the outlet port 66, and the outlet port 64 will be placed in fluid communication with the exhaust fluid port 38. Hydraulic power fluid will then flow outwardly through the outlet port 66 to the servo motor and exhaust fluid will return from the fluid motor through the outlet port 64 to the exhaust port 38.

It will be noted that the liner 24 is retained within the retainer 22 in a circumferential metal-to-metal fit which may be accomplished in any suitable manner, such as by heat shrinking the retainer 22 around the liner 24. This will provide a fluidtight seal between the five annular grooves 50, 80, 34, 82 and 52. Six O-rings 104 are disposed around the retainer 22 in suitable grooves substantially as shown. The liner 24 may then be easily inserted in the housing 20 and the O-rings 104 will provide an annular sealing means for maintaining separation of the fluids in the annular grooves 42, 72, 30, 74 and 44. An end plate 106 is connected to the end of the valve body 20 by any suitable means (not shown) and a sealing gasket 108 is preferably provided to prevent fluid leakage. However, a vertical groove 110 communicates with a passageway 112 in the valve body 20 to transfer any fluid which may seep around the land 92 to the hydraulic reservoir. An O-ring 114 may be provided to adjustably space the retainer 22 at the proper position. At the opposite end, an annular retainer ring 116 both secures the retainer 22 in position and spaces the retainer 22 at the proper position within the valve body 20. A passageway 118 is provided for transferring fluid which passes by the land 94 to the hydraulic reservoir.

The servo valve actuator 14 includes an actuator housing 120 which is formed by two housing halves 122 and 124. The housing half 122 is connected to the valve body 20 by standard bolts (not shown) or any other suitable fastening means. A rear, flexible diaphragm 126 is clamped between the housing half 122 and the valve body 20. The actuator housing half 124 is connected to the housing half 122 by standard bolts (not shown) or any other suitable fastening means. A main flexible diaphragm 128 is clamped between the actuator housing halves 122 and 124. Therefore, it will be noted that the main diaphragm 128 and the actuator housing half 124 form what will hereafter be termed a control fluid chamber 130. The rear and main diaphragms 126 and 128, together with the actuator housing half 122, form what will hereafter be termed a dither fluid chamber 132. In this connection, it will be noted that the area of the main diaphragm 128 is substantially greater than the area of the rear diaphragm 126, such that any fluid pressure within the dither chamber 132 will exert a greater force on the main diaphragm 128 than on the rear diaphragm 126.

The valve spool 18 has a shank portion 134 which extends through the rear diaphragm 126 into the dither fluid chamber 132 and abuts against the main diaphragm 128. An annular spacer 136 is disposed around the shank portion 134 and abuts against a shoulder on the valve spool 18, substantially as shown. An annular radial flange portion 138 of the spacer 136 abuts against the diaphragm 126. A second annular spacer 140 is disposed around the shank portion 134 between the rear and main diaphragms 126 and 128. The shank of the spacer 140 abuts the diaphragm 126 and a radial flange portion 142 abuts against the main diaphragm 128. A plate 144 of substantially the same diameter as the radial flange 142 is disposed in the control fluid chamber 130 and abuts against the other side of the main diaphragm 128. A threaded bolt 146 passes through an aperture in the plate 144, through an aperture in the diaphragm 128, and is threaded into a tapped bore in the shank portion 134 of the valve spool 18. Thus it will be seen that the bolt 146 tightly clamps the rear diaphragm 126 between the flange 138 and the shank of the spacer 140, and also tightly clamps the diaphragm 128 between the radial flange 142 and the plate 144. Therefore both the rear and front diaphragms 126 and 128 will be mechanically connected to the valve spool 18 and the connections will be fluid tight to form the dither fluid and control fluid chambers 132 and 130.

An adjusting screw 148 is threaded through the actuator housing half 124 and is axially aligned with the valve spool 18. A lock nut 150 may be provided to secure the adjusting screw 148 in any desired position. A coiled spring 152 is disposed between the plate 144 and a spring plate 154 which abuts the inner end of the adjusting screw 148. The coiled spring 152 therefore tends to urge the valve spool 18 to the left, when referring to FIG. 1, with a force that varies in accordance with the setting of the adjusting screw 148 and the degree of compression as a consequence of movement at the main diaphragm 128. A control fluid port 156 in the housing half 124 provides fluid communication with the control fluid chamber 130, and a similar dither fluid port 158 in the housing half 122 provides fluid communication with the dither fluid chamber 132, for purposes hereafter to be described.

Referring now to FIG. 2, a system for guiding a web 160 is indicated generally by the reference numeral 162. It will be noted that the servo valve 10 is illustrated schematically and the fluid conduits which are continuations of the servo valve 10 are designated by the same reference numerals which reference the ports in FIG. 1. The power fluid inlet port 26 is connected to a suitable conventional hydraulic pump 164 which draws hydraulic fluid from a reservoir 166 through a hydraulic line 168. The hydraulic exhaust fluid ports 38 and 40 are connected to the reservoir 166. The hydraulic power fluid outlet ports 64 and 66 are connected to introduce fluid to the cylinder of a hydraulic servo motor 170. The hydraulic servo motor 170 is connected to operate a web guide mechanism of the type described and claimed in copending U.S. application of Richard W. Powers, Jr., Serial Number 760,914 filed September 15, 1958, now Patent No. 3,024,955 and assigned to the assignee of the present application. In general, the web guide roller mechanism is comprised of two rollers 172 and 174 between which the web 160 passes. The guide rollers 172 and 174 are journaled on a frame 176 which in turn is journaled on two axles 178 and 180 which are disposed perpendicular to the axes of the rollers 172 and 174 and perpendicular to the path of travel of the web 160. The axles 178 and 180 are connected to slide blocks 182 and 184 which slide along dual rails 186 and 188, respectively. The cylinder of the hydraulic servo motor 170 may conveniently be connected to the rails 186, and the piston 190 connected by the piston rod 200 to the slide blocks 182. When the servo motor piston 190 is moved by hydraulic fluid, as hereafter described, the slide block 182 and therefore the guide rollers 172 and 184, will be moved in an arcuate path generally transversely of the web 160 to reposition or guide the web 160, as described with greater particularity in the above referenced application.

The outlet port of a pneumatic pump or air compressor 210 is connected to the dithering fluid port 158 by a relatively short manifold 212. An adjustable, constant pressure regulator 214 is provided on the manifold 212 for maintaining the pressure within the manifold at a selected average value. The pressure regulator 214 has a low frequency response so as not to attenuate high frequency pressure pulsations as hereafter described in greater detail.

A conduit 216 provides fluid communication between the manifold 212 and a web edge sensing head 218 which is shown in greater detail in FIG. 3. The sensing head 218 illustrated is of the velocity-pressure type wherein air is directed from a nozzle 220 toward a receiving orifice 222. The impact of the air directed from the nozzle 220 in the orifice 222 creates a static pressure in the conduit 224 in accordance with well-known principles. The sensing head 218 is positioned such that when the web 160 is following the desired path of travel, the edge 226 will block a portion of the stream of air from the nozzle 220. Should the web edge 226 move away from the nozzle 220, a lesser portion of the air stream will be blocked and the pressure in the conduit 224 would increase. As the edge of the web 160 moves to cover a greater part of the orifice 222, a greater portion of the stream of air will be blocked and the pressure in the conduit 224 will be reduced. The conduit 224 is connected to the control fluid port 156 of the servo valve 10 so that the pressure within the control fluid chamber 130 will be proportional to the pressure within the orifice 222.

Referring now to FIG. 4, the air compressor 210 is a positive displacement, vane-type compressor and comprises a cylindrically shaped housing 227 which forms a cylindrical pump chamber 228. A rotor member 230 is disposed within the pump chamber 228. The axis of rotation of the rotor 230 is offset from the axis of the cylindrical pump chamber 228, substantially as shown in FIG. 4. Four radially disposed vanes 232 are slidably disposed in the rotor 230 and are moved outwardly by centrifugal force such that the outer edges of the vanes are constantly in sliding engagement with the cylindrical wall of the pump chamber 228. An air intake port represented by the dotted outline 234 may be formed in an end wall 235 of the housing 227 at a circumferential point of rotor travel as indicated and preferably has an outline substantially as illustrated. A compressed air outlet port is located and shaped as indicated by the dotted outline 236, and as previously described, is connected to the manifold 212. Of course, another end plate (not shown) fits over the rotor 230 and completes the housing 227.

Those skilled in the art will recognize that this type of air compressor is basically old and its general mode of operation is well known. As the rotor 230 rotates clockwise, when referring to FIG. 4, air is drawn into the chamber 228 between two successive radial vanes 232. Then as the vanes 232 move around to the outlet port 236, the reduced spacing between the rotor 230 and the wall of the chamber 228 will compress the air. When the leading vane 232 passes over the outlet port 236, the compressed air will flow out into the manifold 212. In this connection, those skilled in the art will also recognize that as compared with more conventional pumps, the leading edge of the outlet port 236 has been moved a few degrees in the direction of rotor rotation. Therefore the outlet port 236 will be uncovered at a later point of travel of the respective vanes 232, and also the effective area of the outlet port 236 is reduced. These two factors result in a pulsating air pressure in the outlet port 236 and manifold 212 having a frequency four times the rate of rotation of the rotor 230. The pulsating pressure operates the pneumatic system as hereafter described in greater detail.

In some instances it may be desired to eliminate the air compressor 210 and to use a source of compressed air which is maintained for various uses around a shop or factory. In such a case, the pulsating apparatus indicated generally by the reference numeral 250 and illustrated schematically in FIG. 5, may be utilized as hereafter described. The pulsating apparatus 250 is comprised generally of a chamber housing 252 which in conjunction with a flexible diaphragm 254 forms a fluid chamber 256. The flexible diaphragm 254 is connected to the chamber housing 252 by a coil support bracket 258, which in turn may be connected to the chamber housing 252 by bolts (not shown) or other suitable fastening means. A magnetic core 260 is reciprocally journaled in the bracket 258 and has a flange 262 which abuts the diaphragm 254. The magnetic core 260 is connected to the diaphragm 254 by a bolt 266 which clamps a plate 264 and the flange 262 on each side of the diaphragm to provide a fluidtight, mechanical coupling. An electromagnetic coil 268 is connected to the coil support bracket 258 by a plate 270 and is disposed around the core 260. A pair of leads 272 are provided for connection to a source of alternating current, such as conventional sixty cycle household current, for energizing the coil and reciprocating the core 260 and therefore the diaphragm 254 at approximately sixty cycles per second. The chamber 256 is placed in fluid communication with the manifold 212 and therefore with the dithering chamber 132 by a suitable adapter coupling 274. The adapter coupling 274 is preferably connected to the manifold 212 in relatively close proximity to the chamber 132. If convenient, the adapter coupling 274 may be connected directly to the dithering chamber 132. Any substantially constant source of air pressure 276, such as that from a compressed air tank, is then connected to the manifold 212 and therefore to the conduit 216. It will be noted that the pressure regulator 214 previously described is retained for maintaining the pressure in the manifold 212 at a selected average pressure.

*Operation*

In order to place the web guide system 162 into operation, the hydraulic pump 164 and the air compressor 210 are started. High pressure hydraulic power fluid is then supplied to the inlet port 26 of the four-way valve 12. A pulsating air pressure will also be supplied to the manifold 212. The pressure regulator 214 will maintain the average pressure in the manifold 212 at a constant value. The pneumatic pump or air compressor 210 produces four pulses of pressure for each revolution, as previously described, which for the common motor speed of 1775 r.p.m. and a four-vaned pump will be on the order of one hundred and fifteen pulses per second. The manifold 212 is sufficiently short that the pressure pulses from the air compressor 210 are not appreciably attenuated and are introduced to the dither chamber 132. Also, as previously described, the frequency response of the pressure regulator 214 is sufficiently low at the frequency of the pressure pulsations as to readily establish a constant average pressure in the manifold 212 without attenuating the pressure pulsations applied to the dithering fluid chamber 132.

The constant average pressure in the manifold 212 is also supplied through the conduit 216 to the sensing head 218 where it is jetted from the nozzle 220. The velocity of the air jet is then converted to a substantially static pressure in the orifice 222, the magnitude of the static pressure being dependent upon the position of the edge 226 of the web 160 relative to the jet of air. The pressure from the orifice 222 is then transmitted through the conduit 224 and the control fluid port 156 to the control fluid chamber 130. The substantial length of the conduit 216, together with the action of the nozzle 220 and the receiving orifice 222, and the length of the conduit 224 is sufficient to substantially attenuate the pulsating air pressure from the air compressor 210 before the control signal reaches the control chamber 130. Slight pulsations of the pressure in the control chamber 130 will not materially affect operation of the servo valve, as will hereafter be described. In fact, in accordance with this invention, when the nature of the sensing head permits, the control fluid pressure may be pulsated in order to dither the valve, although this is not the preferred embodiment.

It will be noted that due to the substantial pressure drops in the conduit 216 and the sensing head 218, the pressure in the control fluid chamber 130 will always be substantially less than the pressure in the dither fluid chamber 132. As previously mentioned, the area of the main diaphragm 128 is much greater than the area of the rear diaphragm 126 so that any pressure in the dither fluid chamber exerts an average net force tending to move the valve spool 18 to the right, when referring to FIG. 1. This net force is always greater than the force exerted on the main diaphragm 128 by the control fluid pressure in the control fluid chamber 130 which exerts a force on the main diaphragm 128 opposing the force exerted by the fluid in the dither fluid chamber 132. However, the force of the spring 152 counterbalances the unbalance in force resulting from the fluid pressures. Further, the adjusting screw 148 can be manipulated to increase the force exerted on the valve spool 18 by the spring 152 so that the three forces may be balanced even though the fluid pressures may vary over a substantial range. It will also be appreciated that the pressure regulator 214, as with all standard pressure regulators, may be adjusted to select the desired average pressure within the manifold 212 and accordingly within the dither chamber 132. Therefore, by adjustment of the pressure regulator 214 and the adjusting screw 148, the average position of the valve spool 18 can be centered at the null or closed position when the edge 226 of the web 160 is at the desired position with relation to the sensing head 218.

The pressure pulsations produced by the air compressor 210 and applied to the dither chamber 132 continually fluctuate above and below the average pressure maintained by the pressure regulator 214. As the pressure in the dither chamber 132 increases slightly above the average pressure, the main diaphragm 128 and therefore the valve spool 18 will be moved slightly to the right, when referring to FIG. 1. Then as the pressure in the dither chamber 132 decreases below the average pressure, the spring 152 and control fluid pressure will force the main diaphragm 128 and therefore the valve spool 18 to the left. This cycle will be repeated approximately one hundred and fifteen times each second so that the valve spool 18 will be such that no net fluid flow through the ports 64 and 66 will result from the dithering and the hydraulic servo motor 170 will not be operated. Yet the dithering of the valve spool 18 will substantially eliminate frictional resistance to movement of the spool as hereinbefore set forth.

Should the web 160 move to the left, when referring to FIG. 3, so as to reduce the pressure in the orifice 222 and therefore in the control fluid chamber 130, the constant average pressure in the dither fluid chamber 132 will move the main diaphragm 128 and therefore the valve spool 18 to the right, when referring to FIG. 1. As the main diaphragm 128 moves to the right, the spring 152 will be compressed until the counterbalancing force of the spring is increased to the point that the vector sum of the force exerted by the pressure in the control fluid chamber 130 and the force exerted by the spring 152 counterbalance the average force exerted on the main diaphragm 128 by the average pressure of the pulsating fluid in the dither fluid chamber 132. Of course, the pulsations in the dither fluid will continue to reciprocate the diaphragm 128 and thereby dither the valve spool 18. High pressure hydraulic power fluid will then pass from the inlet port 26 to the port 66 and will move the piston 190 in such a manner as to manipulate the web guide mechanism and cause the web 160 to move back to the desired position, in a manner well known in the art and as described in U.S. Patent No. 2,797,091. As the fluid pressure increases in the control chamber 130 due to the repositioning of the web, the valve spool 18 will be moved back to the average null or closed position.

Should the web 160 move to the right, when referring to FIG. 3, the pressure in the control chamber 130 will be increased and the valve spool 18 will accordingly be moved to the left. High pressure power fluid will then pass from the power fluid inlet port 26 to the port 64 and move the piston 190 in such a manner as to move the web 160 to the left, back to its original position. In this manner, the web 160 will continually be maintained in its proper position with relation to the sensing head 218. It will be noted that regardless of the position of the valve spool 18 in the valve cavity, the pulsating pressure in the dither chamber 132 continues to dither the spool to prevent sticking and substantially eliminate frictional resistance to movement of the spool by the control fluid pressure. It will also be noted that the adjustable pressure regulator 214 and the adjusting screw 148 provide a means whereby the sensitivity of the servo valve actuator 14 may be varied over a wide range.

Operation of the web guiding system 162 is virtually the same when the pulsating apparatus 250 of FIG. 5 is utilized in place of the pulsating air compressor 210. When the diaphragm 254 is reciprocated by the electromagnetic coil 268, the pressure of the air in the chamber 256, and therefore in the manifold 212 and in the dither chamber 132, will be pulsated at approximately sixty cycles per second. The source of constant pressure 276 together with the pressure regulator 214 will maintain the average pressure in the manifold 212 at a constant value as described above. Therefore, the source of constant air pressure 276 may be the conventional pressure tank which so frequently is available as a source of compressed air in most factories.

Without attempting to enumerate all the various novel components and novel combinations thereof, it will be evident that a novel and highly useful servo valve has been described which when combined with a source of pulsating pressure will be dithered and will be highly sensitive and accurately responsive to slight variations in the pressure of a control fluid. It will also be evident that a web guiding system having a highly novel combination of components which produces an improved guiding system has also been described. A novel means for generating a pulsating pressure to dither the novel servo valve has also been described. Therefore, although several preferred embodiments of the present invention have been described and illustrated, it is to be understood that various changes, substitutions and alterations can be made in the components and combinations of components described above without departing from the spirit and scope of the invention as defined by the appended claims.

I claim:
1. A fluid controlled servo valve comprising:
a valve housing having a valve cavity and a plurality of fluid ports in fluid communication with the valve cavity;
a spool member reciprocally disposed in the valve cavity for controlling the passage of fluid therethrough;
a fluid working surface connected to the spool member for applying force to the spool member as a result of fluid pressure applied to the working surface;
chamber means for applying a fluid pressure to the fluid working surface; and,
means for supplying pulsating fluid pressure to the chamber whereby a pulsating force will be applied to the spool member through the fluid working surface and thereby dither the spool member.

2. A fluid controlled servo valve comprising:
a valve housing having a valve cavity and a plurality of fluid ports in fluid communication with the valve cavity;
a spool member reciprocally disposed in the cavity for controlling the passage of fluid therethrough;
a fluid working surface connected to the spool member for applying force to the spool member as a result of fluid pressure applied to the working surface;
chamber means for applying a fluid pressure to the fluid working surface;
means for supplying a pulsating fluid pressure to the chamber whereby a pulsating force will be applied to the spool member through the fluid working surface,
and means for applying a counterbalancing force to the spool member substantially equal and opposite to the average force applied to the spool member through the working surface as a result of the pulsating fluid pressure,
whereby the spool member will be reciprocated at a frequency corresponding substantially to the frequency of the pulsations of the fluid pressure.

3. A fluid controlled servo valve as defined in claim 2 wherein:
the means for supplying a pulsating fluid pressure to the chamber comprises,
a fluid pump having a pulsating fluid output,
pressure regulator means having a low response at the frequency of the pulsating fluid output for maintaining a substantially constant average fluid pressure in the chamber means without attenuating the pulsations of the output from the fluid pump.

4. A fluid controlled servo valve as defined in claim 2 wherein:
the means for supplying a pulsating fluid pressure to the chamber comprises,
a flexible diaphragm in fluid communication with the fluid in the chamber, and
means for oscillating the flexible diaphragm to create pressure pulsations of the fluid in the chamber.

5. A fluid controlled servo valve as defined in claim 4 wherein:
the means for oscillating the flexible diaphragm comprises an electrical coil member and a core member, one of the members being connected to the diaphragm,
and means for connecting the coil member to a source of alternating potential.

6. A fluid controlled servo valve comprising:
a valve housing having a valve cavity and a plurality of fluid ports in fluid communication with the valve cavity;
a spool member reciprocally disposed in the valve cavity for controlling the passage of fluid therethrough;
a first working surface connected to the spool member for applying force to the spool member as a result of fluid pressure applied to the working surface;
a first fluid chamber means for applying a fluid pressure to the first fluid working surface,
means for supplying a pulsating fluid pressure having a constant average pressure to the first fluid chamber;
a second fluid working surface connected to the spool member for applying a force to the spool member corresponding to the pressure of a control signal fluid;
and counterbalancing means for applying a counterbalancing force to the spool member equal and opposite to the vector sum of the average forces applied to the spool member as a result of fluid pressures applied to the first and second fluid working surfaces.

7. A fluid controlled servo valve comprising:
a valve housing having a valve cavity and a plurality of fluid ports in fluid communication with the valve cavity;
a spool member reciprocally disposed in the valve cavity for controlling the passage of fluid therethrough;
a chamber housing having a flexible diaphragm therein dividing the chamber housing into first and second fluid chambers;
means connecting the flexible diaphragm to the spool member for reciprocating the spool member as a result of fluid pressure applied to each side of the diaphragm member;
means for supplying a pulsating fluid pressure having a constant average pressure to the first fluid chamber;
means for supplying a control fluid having a pressure indicative of a condition being monitored to the second fluid chamber;
and means for applying a counterbalancing force to the spool member equal and opposite to the vector sum of the average forces applied to the spool member as a result of fluid pressure applied to the first and second fluid working surfaces.

8. A fluid controlled servo valve as defined in claim 7 wherein:
the means for applying a counterbalancing force to the spool member comprises a spring means disposed within one of the fluid chambers and acting between the wall of the chamber housing and against the diaphragm member.

9. A fluid controlled servo valve as defined in claim 7 wherein means for applying a counterbalancing force to the spool member is disposed in the second fluid chamber.

10. A web guiding system for guiding a traveling web comprising:
a valve housing forming a valve cavity having a power fluid inlet port and a pair of power fluid outlet ports in fluid communication with the valve cavity;
a spool member reciprocally disposed in the valve cavity for alternately placing each of the power fluid outlet ports in fluid communication with the power fluid inlet port;
a source of high pressure power fluid connected to supply high pressure power fluid to the power fluid inlet port;
a guide means for guiding the relative path of travel of a web, the guide means having a fluid servo motor for actuating the means, the power fluid outlet ports being connected to the fluid servo motor for actuating the servo motor in response to the position of the spool member;
a first working surface connected to the spool member for applying a force to the spool member as a result of fluid pressure applied to the working surface;
a first fluid chamber for applying a fluid pressure to the first fluid working surface;
a second fluid working surface connected to the spool member for applying a force to and moving the spool member in correspondence to the pressure of a control signal fluid;
a second fluid chamber for applying a fluid pressure to the second fluid working surface;
counterbalancing means for applying a counter-balancing force to the spool member which is equal and opposite to the average vector sum of the forces applied to the spool member;
a source of pulsating, constant average pressure fluid;
means placing the source of pulsating, constant average pressure fluid in fluid communication with the first fluid chamber;
fluid operated sensing means for producing a control signal fluid pressure which varies in accordance with the position of the edge of a web, the sensing means having a fluid input port and a fluid output port for transmitting the control signal fluid pressure;
means placing the source of pulsating, constant average pressure fluid in fluid communication with the input port; and,
means for applying a fluid pressure to the second fluid chamber proportional to the pressure in the output port.

11. A web guiding system for guiding a traveling web as defined in claim 10 wherein:
the source of pulsating, constant average pressure fluid comprises
an air compressor having a pulsating pressure output, and
a pressure regulator connected for maintaining the average pressure of the air from the air compressor constant, the pressure regulator having a low frequency response at the frequency of the pulsating pressure generated by the air compressor.

12. A web guiding system for guiding a traveling web as defined in claim 10 wherein:
the source of pulsating, constant average pressure fluid comprises
a fluid manifold in fluid communication with the first fluid chamber and with the fluid input port of the sensing means,
a source of air pressure in fluid communication with the fluid manifold for supplying air under pressure to the manifold;
means for inducing pressure pulsations in the air in the fluid manifold; and
a pressure regulator in fluid communication with the fluid manifold for maintaining a constant average air pressure in the manifold, the pressure regulator having a low frequency response at the frequency of the pressure pulsations induced in the air in the fluid manifold whereby the pressure pulsations will not be appreciably attenuated.

References Cited in the file of this patent
UNITED STATES PATENTS 3,009,664     Huck _____ Nov. 21, 1961
3,039,483     Deering _____ June 19, 1962